United States Patent
Yamamoto et al.

(10) Patent No.: US 10,445,887 B2
(45) Date of Patent: Oct. 15, 2019

(54) TRACKING PROCESSING DEVICE AND TRACKING PROCESSING SYSTEM PROVIDED WITH SAME, AND TRACKING PROCESSING METHOD

(71) Applicant: PANASONIC INTELLECTUAL PROPERTY MANAGEMENT CO., LTD., Osaka (JP)

(72) Inventors: Hiroyuki Yamamoto, Ishikawa (JP); Takeshi Fujimatsu, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 216 days.

(21) Appl. No.: 14/780,086

(22) PCT Filed: Mar. 4, 2014

(86) PCT No.: PCT/JP2014/001174
§ 371 (c)(1),
(2) Date: Sep. 25, 2015

(87) PCT Pub. No.: WO2014/155979
PCT Pub. Date: Oct. 2, 2014

(65) Prior Publication Data
US 2016/0063731 A1 Mar. 3, 2016

(30) Foreign Application Priority Data

Mar. 27, 2013 (JP) .................. 2013-066294

(51) Int. Cl.
G08B 13/196 (2006.01)
G06T 7/292 (2017.01)
H04N 7/18 (2006.01)

(52) U.S. Cl.
CPC ............. *G06T 7/292* (2017.01); *H04N 7/181* (2013.01); *G06T 2207/30196* (2013.01); *G06T 2207/30232* (2013.01); *G08B 13/19608* (2013.01)

(58) Field of Classification Search
CPC ......... G06T 7/2093; G06T 7/292; G06T 1/00; G06T 2207/30196; G06T 2207/30232; G08B 13/19608; H04N 7/181
See application file for complete search history.

(56) References Cited

U.S. PATENT DOCUMENTS 8,224,029 B2 * 7/2012 Saptharishi ........ G06K 9/00771
382/103
8,284,255 B2 10/2012 Yokomitsu
(Continued)

FOREIGN PATENT DOCUMENTS

GB 2482127 A 1/2012
JP 05-083712 4/1993
(Continued)

OTHER PUBLICATIONS

International Search Report (ISR) from International Searching Authority (Japan Patent Office) in International Pat. Appl. No. PCT/JP2014/001174, dated Jun. 3, 3014.
(Continued)

*Primary Examiner* — Chikaodili E Anyikire
(74) *Attorney, Agent, or Firm* — Greenblum & Bernstein, P.L.C.

(57) ABSTRACT

To improve, when performing tracking of moving objects by using captured images taken by multiple cameras, the accuracy of the tracking process across the cameras, a tracking processing device includes: a storage unit that stores, for each camera, a plurality of pieces of intra-camera tracking information including image information of persons obtained from the captured images; a refining unit that
(Continued)

performs refining of the plurality of pieces of intra-camera tracking information and thereby extracts pieces of inter-camera tracking information to be used in a process of tracking the persons across the multiple cameras; and an associating unit that, on the basis of the pieces of inter-camera tracking information, associates the persons in the captured images across the multiple cameras.

17 Claims, 10 Drawing Sheets

(56) References Cited

U.S. PATENT DOCUMENTS

| | | | | |
|---|---|---|---|---|
| 8,379,926 B2* | 2/2013 | Kanhere | ............... | G08G 1/0175 340/907 |
| 9,058,744 B2* | 6/2015 | Huang | ................ | G06K 9/00785 |
| 9,191,633 B2 | 11/2015 | Fujimatsu et al. | | |
| 2003/0048926 A1 | 3/2003 | Watanabe | | |
| 2005/0232467 A1* | 10/2005 | Mohri | ...................... | G06F 3/014 382/103 |
| 2007/0297652 A1* | 12/2007 | Nishiyama | ......... | G06K 9/00255 382/118 |
| 2010/0097475 A1* | 4/2010 | Yokomitsu | ............. | H04N 7/181 348/169 |
| 2011/0199461 A1 | 8/2011 | Horio et al. | | |
| 2013/0293768 A1 | 11/2013 | Niyagawa | | |
| 2014/0362215 A1 | 12/2014 | Yoshio et al. | | |
| 2015/0016798 A1 | 1/2015 | Fujimatsu et al. | | |
| 2015/0262019 A1 | 9/2015 | Miyano | | |
| 2015/0297949 A1* | 10/2015 | Aman | ..................... | G06F 16/70 348/157 |
| 2015/0363638 A1 | 12/2015 | Takahashi | | |

FOREIGN PATENT DOCUMENTS

| | | |
|---|---|---|
| JP | 06-325180 | 11/1994 |
| JP | 2003-087771 | 3/2003 |
| JP | 2006-093955 | 4/2006 |
| JP | 2007-135093 | 5/2007 |
| JP | 2008-035301 | 2/2008 |
| JP | 2008-219570 | 9/2008 |
| JP | 2010-049296 | 3/2010 |
| JP | 2011-193187 | 9/2011 |
| JP | 2011-223242 | 11/2011 |
| JP | 2012-163940 | 8/2012 |
| WO | 2014125882 A1 | 8/2014 |
| WO | 2014050432 A1 | 8/2016 |

OTHER PUBLICATIONS

Office Action from Japan Patent Office (JPO) in Japanese Patent Appl. No. 2013-066294, dated May 2, 2017.

Mar. 27, 2019 Examination Report in corresponding United Kingdom patent application No. 1516981.6.

* cited by examiner

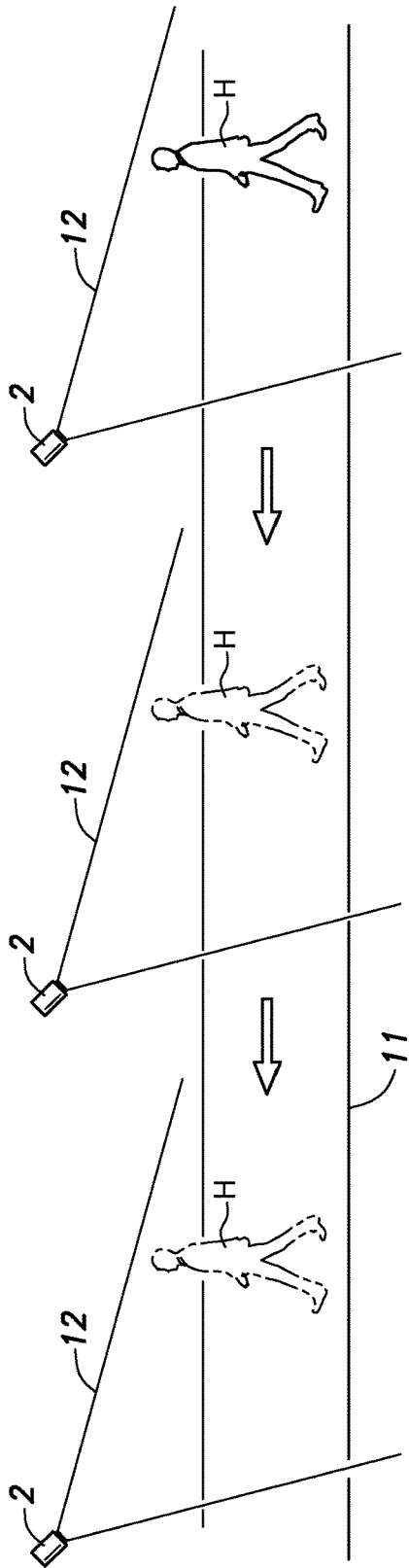

Selection of operation mode of person association ✕

Please select the operation mode of person association.

- ⦿ high accuracy mode
- ○ high speed mode

|  | b1 | b2 | b3 | b4 | Total |
|---|---|---|---|---|---|
| b1 |  | 76 | 72 | 71 | 219 |
| b2 | 76 |  | 88 | 90 | 254 |
| b3 | 72 | 88 |  | 87 | 247 |
| b4 | 71 | 90 | 87 |  | 248 |

TRACKING PROCESSING DEVICE AND TRACKING PROCESSING SYSTEM PROVIDED WITH SAME, AND TRACKING PROCESSING METHOD

TECHNICAL FIELD

The present invention relates to a tracking processing device, a tracking processing system provided with the same and a tracking processing method for tracking moving objects by using captured images taken by multiple cameras.

BACKGROUND ART

Conventionally, there is a tracking processing device that, for monitoring moving objects such as persons and vehicles over a wide area, acquires images captured by cameras set up at multiple locations where moving objects pass and tracks the moving objects in each camera or across the multiple cameras by use of the captured images. In the tracking of the moving objects by this tracking processing device, an occlusion (namely, a state in which a target to be tracked is hidden by another object present in front of the target to be tracked in each camera view) may occur depending on the positional relationship between the camera and a moving object (target to be tracked), and as a result, it may become difficult to perform the tracking of the moving object based on the captured images.

To address such a problem, technologies for reducing the influence of an occlusion or the like and thereby enabling highly accurate tracking have been developed. For example, a tracking processing device is known which includes multiple cameras for capturing images of a monitored space from mutually different points of view, sets multiple assumptions each representing a combination of a predicted position of the moving object at the current time and a monitoring camera, and obtains the position of the moving object at the current time on the basis of the assumption with the highest likelihood (namely, the assumption suitable for the tracking of the moving object) (see Patent Document 1).

PRIOR ART DOCUMENT (S)

Patent Document (S)

Patent Document 1: JP2010-049296A

BRIEF SUMMARY OF THE INVENTION

Task to be Accomplished by the Invention

Incidentally, a blind spot may be created in the field of view (imaging range) of a camera due to an obstacle present in the monitored space (a building structure such as a wall or a pillar, a piece of furniture, etc.), and in the conventional technology described in Patent Document 1, a range excluding such a blind spot or the like is defined as an effective imaging range.

However, in such an effective imaging range also, tracking information unsuitable for the tracking process may be obtained from the captured images as a result of change in the orientation of the moving object or for any other reasons, and there is a problem in the conventional technology described in Patent Document 1 that if such tracking information unsuitable for the tracking process is used, associa- tion of the targets to be tracked across the multiple cameras becomes difficult, and the accuracy of the tracking process decreases significantly.

The present invention is made to solve such a problem in the prior art, and a main object of the present invention is to provide a tracking processing device, a tracking processing system provided with the same and a tracking processing method which, when performing tracking of moving objects by using captured images taken by multiple cameras, can improve the accuracy of the tracking process across the cameras.

Means to Accomplish the Task

The tracking processing device according to the present invention is a tracking processing device for tracking moving objects across a plurality of cameras by using captured images taken by the cameras, the device including: a storage means that stores, for each camera, a plurality of pieces of intra-camera tracking information including image information of the moving objects obtained from the captured images; a refining means that performs refining of the plurality of pieces of intra-camera tracking information and thereby extracts pieces of inter-camera tracking information to be used in a process of tracking the moving objects across the plurality of cameras; and an associating means that, on the basis of the pieces of inter-camera tracking information, associates the moving objects in the captured images across the plurality of cameras.

Effect of the Invention

According to the present invention, when performing tracking of moving objects by using captured images taken by multiple cameras, it is possible to improve the accuracy of the tracking process across the cameras.

BRIEF DESCRIPTION OF THE DRAWINGS

FIG. 2 An explanatory diagram showing an example of an arrangement of cameras in the tracking processing system.

FIG. 3 An explanatory diagram in which

EMBODIMENTS FOR CARRYING OUT THE INVENTION

Figure 1:
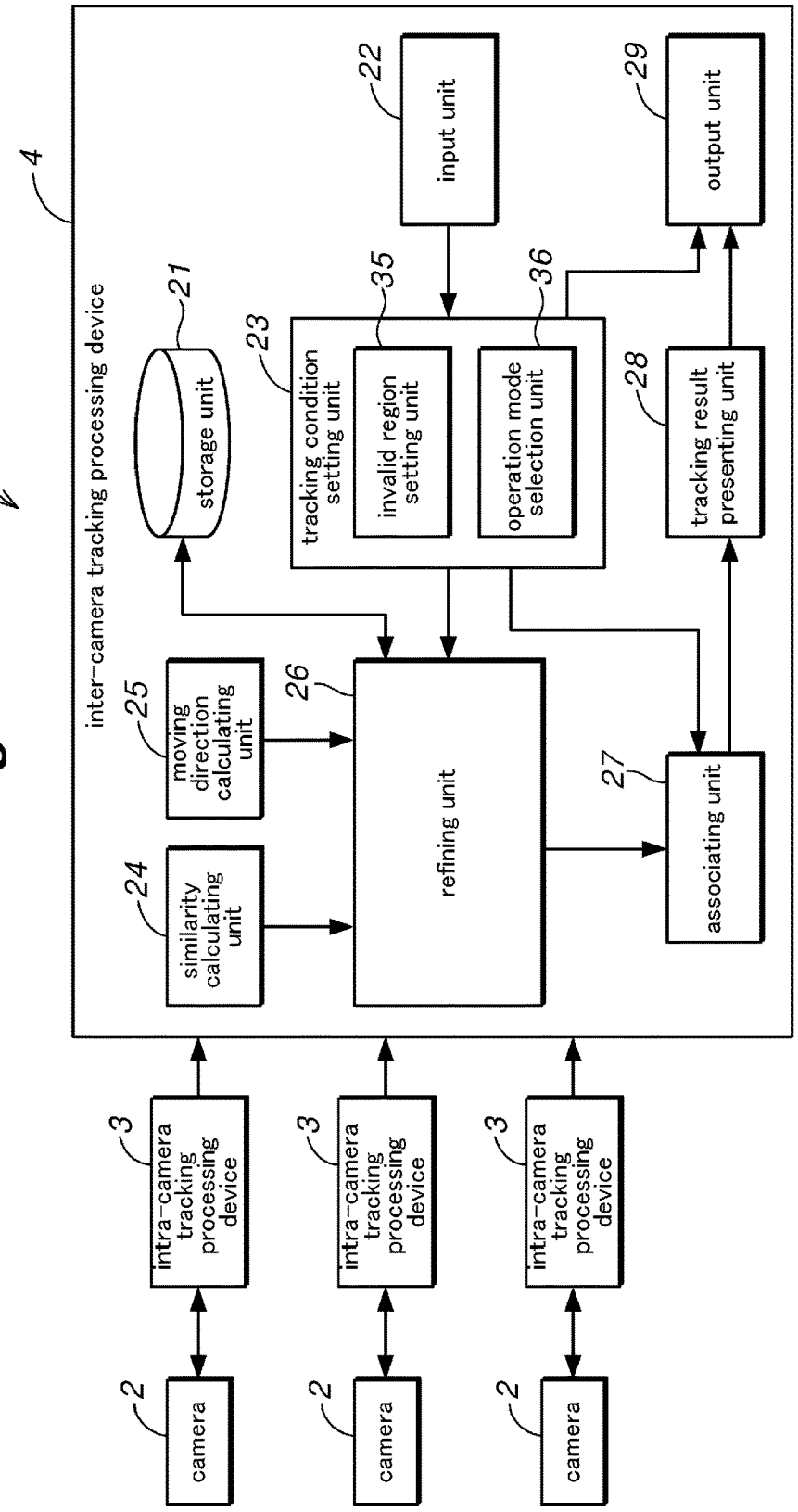
FIG. 1 A block diagram of a tracking processing system according to an embodiment of the present invention.

The first invention made to achieve the above object provides a tracking processing device for tracking moving objects across a plurality of cameras by using captured images taken by the cameras, the device including: a storage means that stores, for each camera, a plurality of pieces of intra-camera tracking information including image information of the moving objects obtained from the captured images; a refining means that performs refining of the plurality of pieces of intra-camera tracking information and thereby extracts pieces of inter-camera tracking information to be used in a process of tracking the moving objects across the plurality of cameras; and an associating means that, on the basis of the pieces of inter-camera tracking information, associates the moving objects in the captured images across the plurality of cameras.

In the tracking processing device according to the first invention, when performing tracking of moving objects (targets to be tracked) by using captured images taken by multiple cameras, the pieces of intra-camera tracking information for each camera are refined (namely, those unsuitable for the tracking process across the multiple cameras are removed) to extract inter-camera tracking information to be used in the tracking process across the multiple cameras, thereby making it possible to improve the accuracy of the tracking process across the multiple cameras (the process of associating the moving objects).

Further, according to the second invention, the tracking processing device of the first invention further includes a similarity calculating means that calculates, with regard to the image information of the moving objects, similarity degrees between the plurality of pieces of intra-camera tracking information, wherein the refining means performs the refining by removing, from the plurality of pieces of intra-camera tracking information, pieces of intra-camera tracking information of which similarity degrees are relatively low.

In the tracking processing device according to the second invention, the plurality of pieces of intra-camera tracking information are refined on the basis of the mutual similarity degrees, and this makes it possible to exclude easily and reliably the pieces of intra-camera tracking information unsuitable for the tracking process across the multiple cameras (those including image information of the moving objects with regard to which a problem such as an occlusion has occurred).

Further, according to the third invention, the tracking processing device of the first or second invention further includes an invalid region setting means that sets, for each camera, an invalid region in the captured images, wherein the refining means performs the refining by removing, from the plurality of pieces of intra-camera tracking information, pieces of intra-camera tracking information relating to the moving objects positioned inside the invalid regions.

In the tracking processing device according to the third invention, pieces of intra-camera tracking information regarding moving objects positioned in the pre-set invalid region (for example, a region in which there is an obstacle) are removed, and therefore, pieces of intra-camera tracking information unsuitable for the tracking process across the multiple cameras can be excluded easily and reliably from those to be processed.

Further, according to the fourth invention, in the tracking processing device of the third invention, the invalid region can be re-set by a user.

In the tracking processing device according to the fourth invention, since the pre-set invalid region can be re-set by the user, the accuracy of the invalid region is improved and the pieces of intra-camera tracking information unsuitable for the tracking process across the multiple cameras can be excluded even more reliably from those to be processed.

Further, according to the fifth invention, in the tracking processing device of the third or fourth invention, the invalid region setting means sets the invalid region on the basis of position information of the moving objects relating to the pieces of intra-camera tracking information removed by the refining means in the past.

In the tracking processing device according to the fifth invention, since the invalid region is set by use of the position information of the moving objects relating to the pieces of intra-camera tracking information removed in the past, the invalid region can be set easily and accurately.

Further, according to the sixth invention, the tracking processing device of any one of the first to fifth inventions further includes an operation mode selecting means that selects, with regard to a process performed by the associating means, a first operation mode that prioritizes processing accuracy or a second operation mode that prioritizes processing speed, wherein, when the first operation mode is selected, the associating means performs association of the moving objects on the basis of the pieces of inter-camera tracking information, and when the second operation mode is selected, the associating means performs association of the moving objects on the basis of the pieces of intra-camera tracking information.

In the tracking processing device according to the sixth invention, the process of the associating means can be executed appropriately depending on the degrees of priority of the processing accuracy and the processing speed.

Further, according to the seventh invention, the tracking processing device of any one of the first to sixth inventions further includes a moving direction calculating means that, on the basis of position information of the moving objects in the plurality of pieces of intra-camera tracking information, calculates moving direction vectors of the moving objects, wherein the refining means extracts the pieces of inter-camera tracking information on the basis of degrees of correspondence of angles of the moving direction vectors between the plurality of cameras.

In the tracking processing device according to the seventh invention, because the angle of the moving direction vector of a moving object tends to coincide with the orientation of the moving object, it is possible to improve the accuracy of the tracking process across the cameras by extracting, as the pieces of inter-camera tracking information, pieces of intra-camera tracking information with moving direction vectors having a high degree of correspondence between their angles.

Further, according to the eighth invention, the tracking processing device of any one of the first to seventh inventions further includes a result presenting means that presents a result of association of the moving objects performed by the associating means to a user to allow the user to determine whether the result of the association is appropriate.

In the tracking processing device according to the eighth invention, since whether the result of the association of the moving objects is appropriate is determined by the user, it is possible to further improve the accuracy of the tracking process across the multiple cameras.

Further, the ninth invention provides a tracking processing system including: the tracking processing device according to any one of the first to eighth inventions; the plurality of cameras; and an intra-camera tracking device that generates the intra-camera tracking information.

Further, the tenth invention provides a tracking processing method for tracking moving objects across multiple cameras by using captured images taken by the cameras, the method including: a tracking information acquisition step of acquiring, for each camera, a plurality of pieces of intra-camera tracking information including image information of the moving objects obtained from the captured images; a tracking information refining step of refining the plurality of pieces of intra-camera tracking information and thereby extracting pieces of inter-camera tracking information to be used in a process of tracking the moving objects across the plurality of cameras; and an associating step of associating, on the basis of the pieces of inter-camera tracking information, the moving objects in the captured images across the plurality of cameras.

In the following, embodiments of the present invention will be described with reference to the drawings.

FIG. 1 is a block diagram of a tracking processing system according to an embodiment of the present invention, FIG. 2 is an explanatory diagram showing an example of an arrangement of cameras in the tracking processing system, and FIG. 3 is an explanatory diagram for showing (A) selection of an operation mode and (B) setting of an invalid region performed by a user of the tracking processing system.

The tracking processing system 1 mainly includes: multiple (here, three) cameras 2 that capture images of moving objects to be tracked such as persons or vehicles; intra-camera tracking processing devices 3 which are connected to respective cameras 2 and perform a process of tracking the moving objects in the captured images of the respective cameras 2 (hereinafter, "intra-camera tracking process"); and an inter-camera tracking processing device 4 that acquires a result of the process of tracking of the moving objects performed by each intra-camera tracking processing device 3 (hereinafter, "intra-camera tracking information") and performs a process of tracking across the multiple cameras 2. In the following description, the process of tracking across the cameras and the inter-camera tracking processing device 4 may be simply referred to as "tracking process" and "tracking processing device 4," respectively, and are distinguished from the intra-camera tracking process and the intra-camera tracking processing devices 3, respectively.

The multiple cameras 2 each consist of a video camera for monitoring, and successively provides the respective intra-camera tracking processing devices 3 with multiple captured images (color motion picture). These cameras 2 are installed in the wall, ceiling, etc. of a building or the like so as to be able to capture images of the locations that need monitoring. In the illustrated embodiment, as shown in FIG. 2, a person (moving object) H walking on the passage 11 in a direction indicated by arrows is regarded as a target to be tracked, and the arrangement of each camera 2 (namely, positional relationship between each camera and the position of the passage on which the person moves) is adjusted such that the size and the angle (orientation of the body) of the image-captured person H become approximately the same between the cameras. Further, each camera 2 is provided with a pun and tilt function and a zoom function to adjust the size and the angle of the image-captured person H.

In the illustrated embodiment, the imaging angle of each camera 2 is tilted relative to the vertical direction (up and down direction of the drawing) so as to be obliquely downward, but the imaging direction of each camera may be arbitrary so long as person images necessary for the tracking process can be obtained. Further, in the illustrated embodiment, the multiple cameras 2 are arranged such that their fields of view (imaging ranges) do not overlap each other, but they may be arranged such that their fields of view overlap each other when necessary. Yet further, the number of cameras used in the tracking processing system 1 may be changed as necessary.

Each intra-camera tracking processing device 3 consists of a PC (Personal Computer) connected with the corresponding camera 2 via a dedicated cable or a network such as a LAN, but it is not limited thereto, and the intra-camera tracking processing device 3 may be constituted of a server or an electronic device or the like incorporated with a microcomputer that performs a tracking process. In the illustrated embodiment, one intra-camera tracking processing device 3 is provided for each camera 2, but the system of the present invention is not limited thereto, and the captured images taken by the multiple cameras 2 may be processed individually by a single intra-camera tracking processing device 3. Further, a configuration in which some functions of the intra-camera tracking processing devices 3 are added to each camera 2 or the tracking processing device 4, which will be described in detail later, is also possible.

Each intra-camera tracking processing device 3 performs an intra-camera tracking process of the image-captured person(s) on the basis of the image signal (captured images) input from the corresponding camera 2. This intra-camera tracking process is performed using a known person tracking (tracing) technology. For example, the intra-camera tracking processing device 3 compares each captured image taken by the camera 2 with a background image obtained in advance (calculates the difference in brightness value of each pixel) (background subtraction) and thereby extracts a changing region where a moving object exists. The background image is a captured image not including a moving object and is captured in advance by each camera 2. Each intra-camera tracking processing device 3 detects, in the changing region, a rectangular person region that encompasses a person and a part of the background, by using known feature values (for example, HOG (Histogram of Oriented Gradient) feature values). The intra-camera tracking processing device 3 detects, for each captured image, a person region, and tracks the person region by use of a known template matching or tracking filter (for example, particle filter). The intra-camera tracking processing device 3 stores the information of each person image detected (pixel information of the person region) and its relevant information (such as the position information of the person) in a predetermined memory as intra-camera tracking information.

Multiple pieces of intra-camera tracking information obtained by the above-described intra-camera tracking process are forwarded successively to the tracking processing device 4. It is to be noted that the intra-camera tracking process is not limited to the above-described method. For example, it is also possible to detect, as a person, a set (region) of pixels in which a motion occurred as a result of inter-frame subtraction between captured images with consecutive capture times. If multiple different persons are present in a captured image, the intra-camera tracking information is obtained for each person.

The tracking processing device 4 consists of a PC connected with the intra-camera tracking processing devices 3 via dedicated cables or a network such as a LAN, but it is not limited thereto and the tracking processing device 4 may be configured of a server or an electronic device or the like incorporated with a microcomputer that performs a tracking process. The tracking processing device 4 includes a storage unit (storage means) 21 that stores the intra-camera tracking information input successively from the intra-camera tracking processing devices 3, and a tracking condition setting unit 23 that, based on user input information, sets a processing condition in the tracking processing device 4. The user input information is input by a user via an input unit 22. The tracking condition setting unit 23 includes an invalid region setting unit 35 that, according to the user input information, sets an invalid region in the captured image (imaging range) of each camera 2, and an operation mode selection unit (operation mode selection means) 36 that, according to the user input information, selects an operation mode (first operation mode or second operation mode) of an associating unit 27.

Further, the tracking processing device 4 includes: a similarity calculating unit (similarity calculating means) 24 that calculates, for each camera 2, similarity degrees between multiple pieces of intra-camera tracking information; a moving direction calculating unit (moving direction calculating means) 25 that calculates, on the basis of the position information of the persons in the multiple pieces of intra-camera tracking information, moving direction vectors of the persons; a refining unit (refining means) 26 that narrows down, for each camera 2, the multiple pieces of intra-camera tracking information for each camera 2 (namely, removes unsuitable pieces of intra-camera tracking information) and thereby extracts tracking information to be used in the process of tracking the persons across the cameras 2 (hereinafter referred to as "inter-camera tracking information"); an associating unit (associating means) 27 that, on the basis of the extracted inter-camera tracking information, associates the persons in the captured images across the cameras 2; and a tracking result presenting unit (result presenting means) 28 that presents the result of the association of the persons performed by the associating unit 27 to the user and allows the user to determine appropriateness of the result of the association. The tracking result presenting unit 28 presents a series of results of the association of the persons to the user via an output unit 29.

The output unit 29 consists of a liquid crystal display and the input unit 22 consists of a keyboard and a mouse, but they are not limited thereto. For example, the output unit 29 and the input unit 22 may be embodied by use of another device such as a touch panel display.

The user input information includes at least information on the position and size of each invalid region in the captured images (described later) and selection information of the operation mode of the associating unit 27 regarding the associating process (here, a high precision mode and a high speed mode).

The inter-camera tracking information includes information of the person images captured by the cameras 2 (pixel information of the person regions) as well as relevant information such as the position of the person, capture time and a vector of the moving direction of the person, which are associated with the respective person images. The position information of a person is constituted of a history of the position of the person region (moving trajectory of the person). The position of a person may be detected by a variety of known methods, but in this embodiment, the coordinate of the top of the head of the person is used as a reference position of the person.

Figures 3A, 3B:
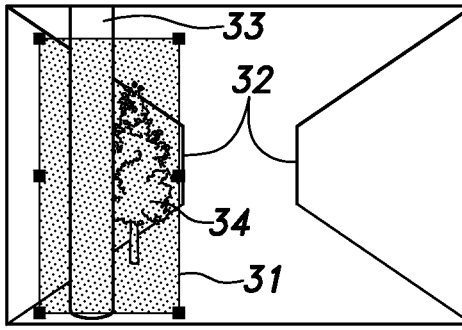
FIG. 3A shows selection of an operation mode and ER)
FIG. 3B shows setting of an invalid region performed by a user of the tracking processing system.

The tracking condition setting unit 23 has a GUI (Graphical User Interface) function. As shown in FIG. 3, in user input screens displayed on the output unit 29, the user can input, via the input unit 22, user input information such as a tracking condition. In an operation mode selection screen shown in FIG. 3A which relates to the associating process, the user can select by mouse click either a high precision mode (first operation mode) that prioritizes processing accuracy or a high speed mode (second operation mode) that prioritizes processing speed.

In an invalid region setting screen shown in FIG. 3B, the user can set an invalid region 31 in the captured image (imaging range) 30. More specifically, the user can set an invalid region 31 (a rectangular region shown by hatching in the captured image 30) by dragging the mouse pointer over a region in which the user, observing the captured image 30, considers that a valid person image cannot be obtained.

The invalid region 31 may be held as a candidate region until confirmed by the user (for example, until the user presses a confirmation button not shown in the drawings), such that the user can re-set the invalid region 31 at a suitable time (correction of the position and/or size). For example, the user can move the invalid region 31 (candidate region) by dragging the mouse pointer after placing it on a part in the invalid region 31, and can change the size of the invalid region 31 by dragging the mouse pointer after placing it on one of the black square marks shown on the sides defining the invalid region 31. The system of the present invention is not limited to this embodiment, and the user may set (or re-set) an invalid region 31 by inputting the coordinates defining the invalid region 31 (for example, coordinates of four corners of a rectangular region).

In the example shown in FIG. 3B, a region around a fence 32, a utility pole 33 and a roadside tree 34, where an occlusion tends to occur, may be set as an invalid region, but the present invention is not limited thereto, and the user can set, depending on the situation of the imaged area, a region around another obstacle (such as a building structure, a piece of furniture, etc.) as an invalid region. Further, the invalid region is not limited to a region where an occlusion tends to occur, and a region in which the direction of movement of persons is different from the other region (for example, a passage extending in a direction different from that of a main passage), a dark region (for example, a place where the sunlight or lighting is blocked and a person therein is obscured), or a region located at a peripheral portion of the imaging range of the camera such that a sufficient reliability of the image cannot be ensured may be set as an invalid region. Further, though FIG. 3B shows only one rectangular invalid region 31, an arbitrary number (including zero) of invalid regions 31 having arbitrary shapes may be set. The information on the set invalid region 31, such as the position and size, constitutes a part of setting data relating to a tracking processing condition, which will be described in detail later, and is stored in a storage unit 21 as an invalid region map associated with each camera 2.

The similarity calculating unit 24 compares the person images regarding the multiple pieces of intra-camera tracking information, and thereby evaluates similarity degrees between the pieces of intra-camera tracking information. More specifically, the similarity calculating unit 24 creates RGB color histograms for respective person regions or for respective subregions obtained by dividing the person regions, and calculates the similarity degrees between them by use of a Bhattacharyya coefficient. The color histograms are normalized so that they are affected less easily by a difference in size of the person regions. Further, in a case where each person region is divided, the similarity degrees between the color histograms are compared to each other by using an average of the similarity degrees of the respective subregions.

It is to be noted that the calculation of the similarity degrees (evaluation of similarity) performed by the similarity calculating unit 24 is not limited to that described here, and another known method may be used. However, using color histograms can beneficially avoid a problem caused from the difference in size between the person images. Further, the similarity calculating unit 24 may determine an evaluation region (for example, a head and a torso) in each person image by use of a known method (for example, by use of feature values relating to the outer shape of the head, trunk, leg, etc. which are commonly present in persons), and calculate the similarity degree with respect to the evaluation region.

As will be described in detail later, the refining unit 26 can acquire the invalid region map set by the invalid region setting unit 35 and refine the multiple pieces of intra-camera tracking information on the basis of the invalid region map. Namely, the refining unit 26 removes pieces of intra-camera tracking information relating to the persons present in the invalid region(s) set by the user, and thereby excludes easily and reliably the pieces of intra-camera tracking information unsuitable for the tracking process across the cameras 2 from the pieces of information to be taken into account in the tracking process.

Further, the refining unit 26 can acquire the similarity degrees calculated by the similarity calculating unit 24 and refine the multiple pieces of intra-camera tracking information on the basis of the similarity degrees. Namely, the refining unit 26 refines the multiple pieces of intra-camera tracking information on the basis of the similarity degrees therebetween, and thereby excludes easily and reliably the pieces of intra-camera tracking information unsuitable for the tracking process across the cameras 2 (such as an image representing a person whose moving direction is different from those of the persons represented by other images or an image in which an occlusion has occurred) from the pieces of information to be taken into account in the tracking process.

Further, the refining unit 26 can acquire the moving direction vectors calculated by the moving direction calculating unit 25 and refine the multiple pieces of intra-camera tracking information on the basis of the moving direction vectors. Namely, because the angle of a moving direction vector representing the moving direction of a person tends to coincide with the orientation of the person, the refining unit 26 extracts, as the pieces of inter-camera tracking information, pieces of intra-camera tracking information with the moving direction vectors having a high degree of correspondence between their angles, and thereby improve the accuracy of the tracking process across the cameras 2.

Though not shown in the drawings, the units 23 to 28 of the tracking processing device 4 are realized by a CPU (Central Processing Unit) that performs an operation and control according to predetermined programs (such as a program for the tracking process), a ROM (Read Only Memory) storing a control program, a RAM (read only memory) serving as a work memory, etc. The storage unit 21 may be any storage device that can store, as least temporarily, information necessary for the tracking process performed by the tracking processing device 4, and in this embodiment, consists of a hard disk. However, the storage unit 21 is not limited thereto, and another storage device such as an optical disk or a flash memory may be used.

Figure 4:
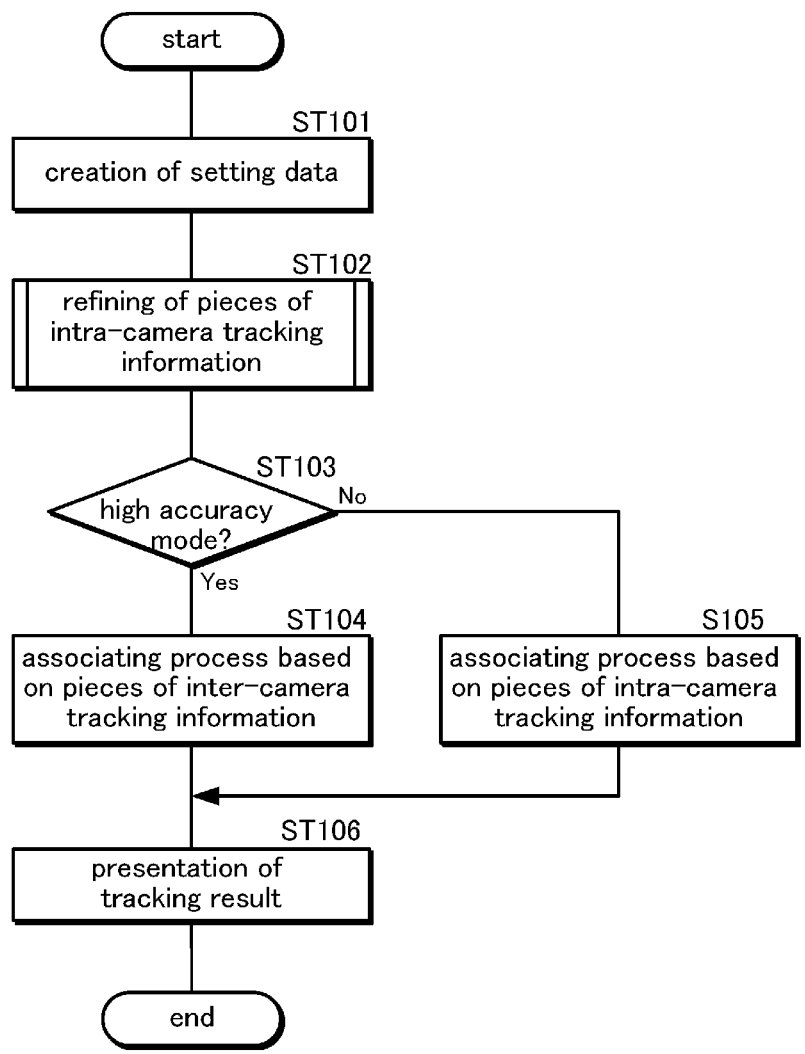
FIG. 4 A flowchart showing a flow of the tracking process performed by the tracking processing device shown in FIG. 1.
Figure 5:
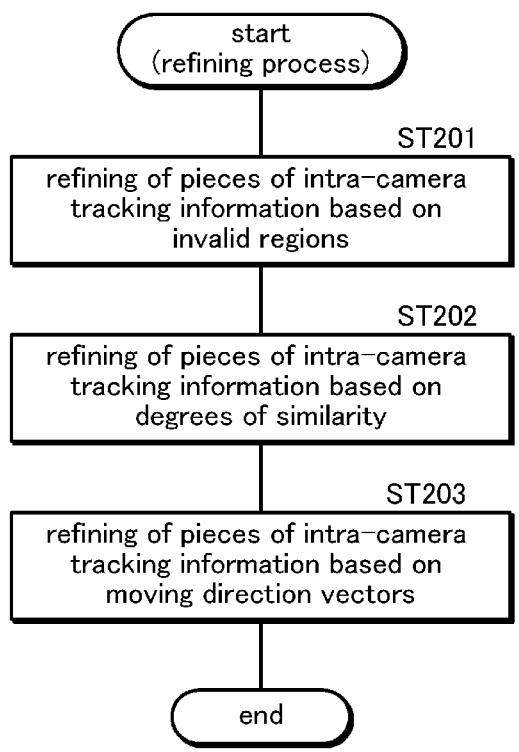
FIG. 5 A flowchart showing step ST102 in FIG. 4 in detail.
Figure 6:
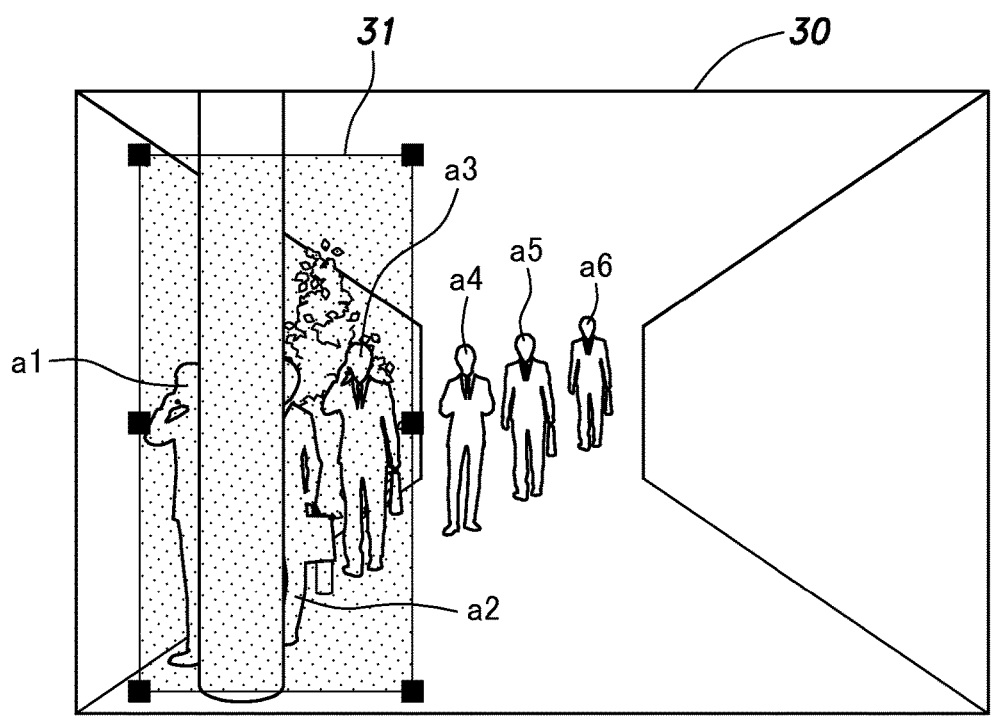
FIG. 6 An explanatory diagram schematically showing the process of step ST201 in FIG. 5.
Figure 8A:
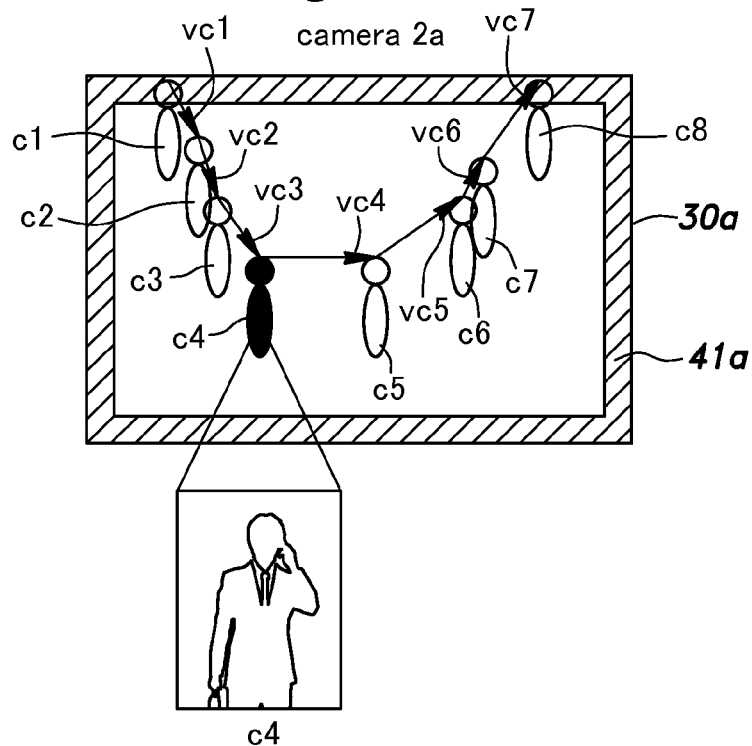
FIG. 8 An explanatory diagram schematically showing in FIG. 8A and FIG. 8B the process of step ST203 in FIG. 5.
Figure 8B:
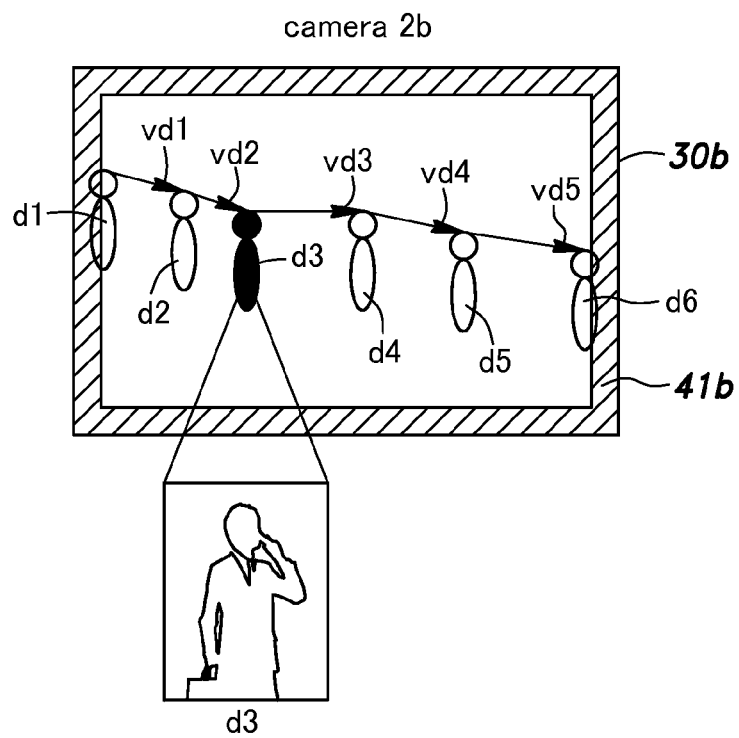
Figure 9:
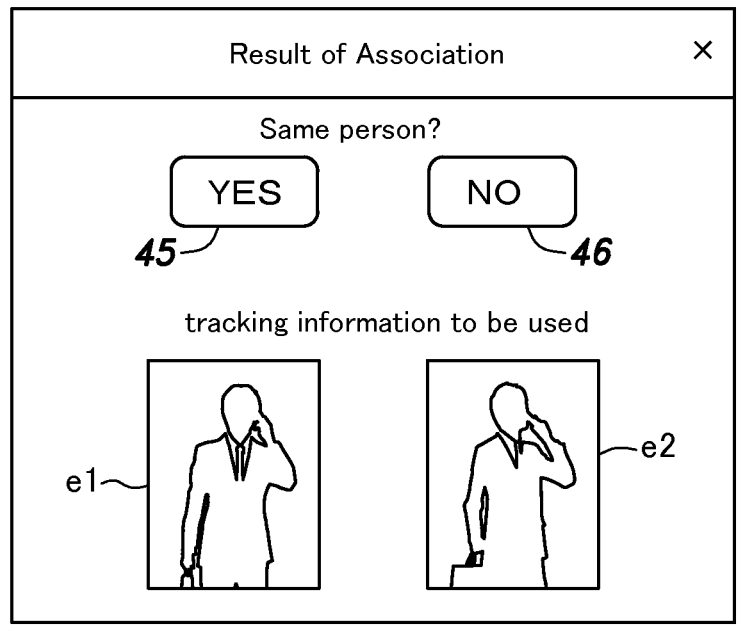
FIG. 9 A diagram showing an example of a screen display regarding presentation of a result of tracking of step ST106 in FIG. 4.

FIG. 4 is a flowchart showing a flow of the tracking process performed by the tracking processing device 4, FIG. 5 is a flowchart showing step ST102 in FIG. 4 in detail, FIG. 6, FIG. 7 and FIG. 8 are explanatory diagrams schematically showing the processes of steps ST201, ST202 and ST203 in FIG. 5, respectively, and FIG. 9 is a diagram showing an example of a screen display regarding presentation of a result of tracking of step ST106 in FIG. 4.

As shown in FIG. 4, in the tracking process, the tracking condition setting unit 23 first creates setting data regarding the tracking processing condition on the basis of the user input information input by the user (ST101). The setting data created here includes at least the aforementioned invalid region map and selection information of the operation mode of the associating unit 27. It is to be noted that in ST101, the tracking condition setting unit 23 does not necessarily have to create the setting data anew, and the setting data created in the past process may be used with partial modification or without modification.

Next, the refining unit 26 refines, for each camera 2, the pieces of intra-camera tracking information (ST102). In this refining process, as shown in FIG. 5, the refining unit 26 performs the refining of the multiple pieces of intra-camera tracking information on the basis of the invalid region map (ST201). In ST201, as shown in FIG. 6 for example, the position of each of persons a1 to a6 in the captured image 30 is compared with the position of the invalid region 31 set by the user (refer to FIG. 3B also), and the pieces of intra-camera tracking information relating to persons a1 to a3 determined to be inside the invalid region 31 are removed, to thereby narrow down the pieces of information intra-camera tracking information to those relating to persons a4 to a6.

Here, whether each person a1 to a6 is inside the invalid region 31 is determined on the basis of whether an entirety of the person region relating to each person a1 to a6 is inside the invalid region 31, but the present invention is not limited thereto and a variety of methods may be used. For example, the refining unit 26 may perform the determination by determining whether a reference coordinate of the person region (for example, a coordinate of the center of the head) is inside the invalid region 31.

Further, for the sake of convenience of explanation, FIG. 6 shows multiple persons a1 to a6 (namely, a moving trajectory of the same person walking from a far side to a near side in the drawing) in one captured image 30, but persons a1 to a6 are actually included in respective multiple captured images (for example, multiple frames constituting a motion picture) (this also applies to the persons in FIGS. 7A, 8A and 8B described later).

With reference to FIG. 5 again, the refining unit 26 refines the multiple pieces of intra-camera tracking information on the basis of their mutual similarity degrees obtained from the similarity calculating unit 24 (ST202). In ST202, with regard to persons b1 to b4 in the captured image 30 shown in FIG. 7A, the similarity calculating unit 24 calculates similarity degrees therebetween. In FIG. 7A, each of the multiple persons in the captured image 30 is shown in a simplified manner with a circle (substantially corresponding to the head) and an ellipse (substantially corresponding to the torso and legs) (this also applies to later-described FIG. 8). FIG. 7B shows a table collectively showing the mutual similarity degrees. In this table, for example, the similarity degrees of person b1 (in the vertically arranged cells) in relation to persons b2, b3 and b4 (in the horizontally arranged cells) are 76, 72 and 71, respectively, and the total of these similarity degrees is 219. Each value shown represents a degree of similarity. Likewise, the total similarity degrees of persons b2, b3 and b4 (in the vertically arranged cells) are 254, 247 and 248, respectively.

Figures 7A, 7B:
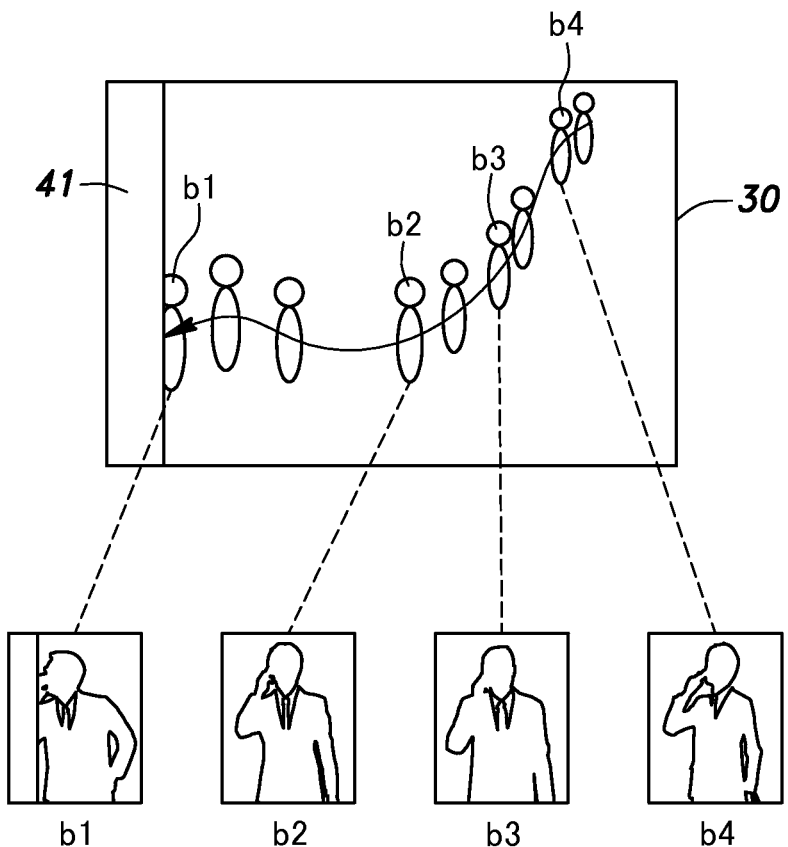
FIG. 7 An explanatory diagram schematically showing in FIG. 7A and FIG. 7B the process of step ST202 in FIG. 5.

The differences between the similarity degrees of persons b1 to b4 shown in FIG. 7B may be attributed to an occurrence of an occlusion, erroneous detection of a person, etc.

The refining unit 26 uses the total similarity degrees shown in FIG. 7B as evaluation values to be used in the process of ST202. The refining unit 26 removes the intra-camera tracking information relating to person b1 whose total similarity degree is the lowest, to thereby narrow down the pieces of intra-camera tracking information to those relating to persons b2 to b4.

It is to be noted that the captured image 30 shown in FIG. 7A includes multiple persons (moving trajectory) other than persons b1 to b4, but in the illustrated embodiment, the similarity degrees are evaluated with regard to persons b1 to b4 for the sake of convenience of explanation. Further, the illustrated embodiment is configured to remove the information relating to person b1 with the lowest evaluation value (total similarity degree), but it is also possible, for example, to set a predetermined threshold value for the evaluation values and to remove the pieces of intra-camera tracking information relating to all persons with an evaluation value lower than the threshold value. Alternatively, it is also possible to extract, as the inter-camera tracking information, the intra-camera tracking information relating to a person with the highest evaluation value (here, person b2) (the other information is all removed). Further, though ST202 is performed independently of the refining process of aforementioned ST201, it is also possible to perform the process of ST202 for the persons refined by the process of ST201 (for example, persons a4 to a6 in FIG. 6). In this case, the order of performing the processes of ST201 and ST202 is changeable.

With reference to FIG. 5 again, the refining unit 26 refines the multiple pieces of intra-camera tracking information on the basis of the moving direction vectors obtained from the moving direction calculating unit 25 (ST203). In the refining process of ST203, with regard to the captured image 30a of the first camera 2a, moving direction vectors vc1 to vc7 of persons c1 to c7 are obtained as shown in FIG. 8A, and with regard to the captured image 30a of the second camera 2b, moving direction vectors vd1 to vd5 of persons d1 to d5 are obtained. These moving direction vectors vc1 to vc7 and moving direction vectors vd1 to vd5 are calculated on the basis of the coordinates of a specific portion (here, top of the head) of the person at consecutive capture times (namely, temporally ordered one after another in the moving trajectory).

The refining unit 26 compares the angles of the moving direction vectors vc1 to vc7 in the captured image of the first camera 2a with the angles of the moving direction vectors vd1 to vd5 in the captured image of the second camera 2b, and selects pieces of intra-camera tracking information regarding the persons (here, person c4 and person d3) with the moving direction vectors having the highest degree of correspondence of the angles (the angle formed therebetween being the smallest) as a pair of pieces of inter-camera tracking information (namely, pieces of intra-camera tracking information to be taken into account in the inter-camera tracking process).

It is to be noted that, in FIGS. 8A and 8B, peripheral portions 41a, 41b of the captured images 30a, 30b (namely, peripheral portions of the imaging ranges of the cameras) are shown with hatching. In these peripheral portions 41a, 41, the reliability of the image is lowered due to deformation of an image-captured object, and therefore, persons c1, c8 and persons d1, d6 positioned in these peripheral portions 41a, 41b are preferably excluded in advance from those that can be selected. Further, it is preferred that the refining unit 26 determines the magnitude of each moving direction vector and excludes the vectors having a magnitude smaller than a predetermined threshold value from those to be processed in ST203. Thereby, when the person is moving at a low speed or is stationary, a reduction in the reliability of the angle of the moving direction vector can be avoided.

Further, though ST203 is performed independently of the refining processes of aforementioned ST201 and ST202, it is also possible to perform the process of ST203 for the person images refined by at least one of the process of ST201 and ST2020. In this case, the order of performing the processes of ST201 to ST203 is changeable.

Though shown in FIG. 5 as part of the flow, it is not necessarily required to execute all of the aforementioned steps ST201 to ST203 in the refining process of the intra-camera tracking information. In the refining process, pieces of inter-camera tracking information are extracted by at least one or a combination of two or more of ST201 to ST203.

With reference to FIG. 4 again, the associating unit 27 confirms the operation mode on the basis of the setting data (ST103), and when the high precision mode is selected (Yes), associates the persons across the cameras 2 on the basis of the pieces of inter-camera tracking information extracted in ST102 (ST104). In the present embodiment, one piece of inter-camera tracking information is extracted for each camera 2 (namely, the multiple pieces of intra-camera tracking information are removed except for one), but a configuration may also be made such that two or more pieces of inter-camera tracking information are extracted for each camera 2.

On the other hand, when the high speed mode is selected (ST103: No), the associating unit 27 associates the persons across the cameras 2 on the basis of the multiple pieces of intra-camera tracking information before being processed in ST102 (ST105). In this case, the association of the persons across the cameras 2 is performed on the basis of pieces of intra-camera tracking information selected appropriately, one for each camera, from the multiple pieces of intra-camera tracking information. For example, the associating unit 27 may select a piece of intra-camera tracking information on the basis of the capture times of a predetermined person detected in the captured images of each camera 2 (for example, the one with the earliest or latest capture time).

Subsequently, the tracking result presenting unit 28 presents the result of the associating process in ST104 or ST105 to the user (ST106). In ST106, as shown in FIG. 9, person images e1, e2 regarding a pair of pieces of intra-camera tracking information associated between two cameras are displayed on the screen. The user visually confirms whether the person images e1, e2 are of the same person, and when it is determined that they are of the same person, can press a "Yes" button 45 to acknowledge the association, while when it is determined that they are not of the same person, can press a "No" button 46 to reject the association. When the "No" button 46 is pressed, it is possible to determine that the association failed and to terminate the process, but it is preferred to display multiple person images as candidates for the association so that the user may select the most appropriate person image from among them to fix the result of the associating process. The process of ST106 may be performed not only such that the pieces of intra-camera tracking information, one for each camera, are associated with one another, but also such that the pieces of intra-camera tracking information, multiple pieces for each camera, are associated with one another. Further, the processes of ST104 and ST105 may be performed likewise across the other different cameras.

Figure 10:
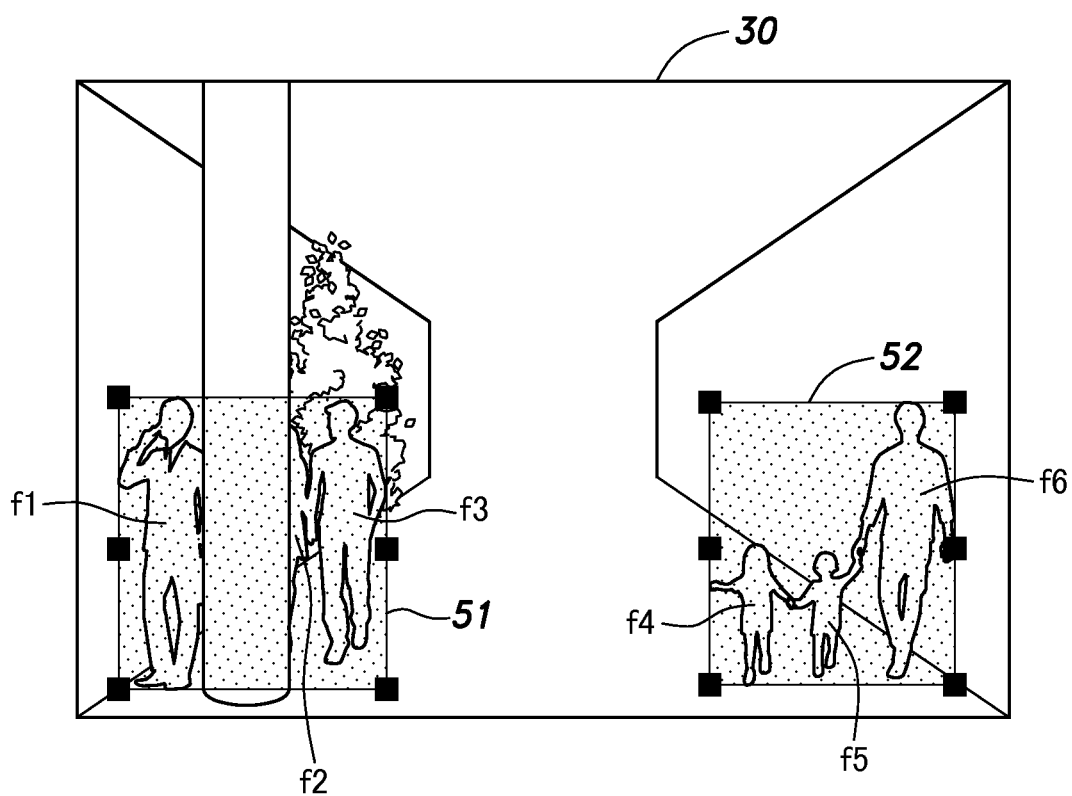
FIG. 10 An explanatory diagram showing a modification of the setting of an invalid region in the tracking processing device.

FIG. 10 is an explanatory diagram showing a modification of the setting of the invalid region in the tracking processing device. In the above-described example shown in FIG. 3B, the invalid region 31 was set by the user, but the tracking processing device 4 may set an invalid region (or a candidate region therefor) on the basis of the past result of the tracking process.

The tracking processing device 4 successively stores the result of the past refining processes in the storage unit 21 to set the invalid region. Namely, the storage unit 21 stores, for each camera 2, data such as coordinate information of the person regions relating to the pieces of intra-camera tracking information removed in the past by ST201 to ST203 (or at least one of them) in FIG. 5. As shown in FIG. 10, on the basis of the result of the past refining processes, the invalid region setting unit 35 can set, as invalid regions 51, 52, rectangular regions each encompassing a region in the captured image 30 where persons whose piece of intra-camera tracking information were removed (persons f1 to f6 in FIG. 10) were detected frequently. In this case, by taking into account the capture times of the removed pieces of intra-camera tracking information (namely, by referring to only the result of the refining relating to the persons image-captured in the same time slot), the accuracy of estimation of the invalid regions 51, 52 can be improved. With regard to the invalid regions 51, 52 also, the user can re-set them in a manner similar to that described above with respect to the invalid region 31 shown in FIG. 3B.

In the foregoing, the present invention has been described in terms of specific embodiments thereof, but these embodiment are mere examples and the present invention is not limited by the embodiments. It is also to be noted that not all of the structural elements of the tracking processing device, tracking processing system provided with the same and tracking processing method according to the present invention shown in the foregoing embodiments are necessarily indispensable, and they may be selectively used as appropriate without departing from the scope of the present invention.

INDUSTRIAL APPLICABILITY

The tracking processing device, tracking processing system provided with the same and tracking processing method according to the present invention can improve, when performing tracking of moving objects by using captured images taken by multiple cameras, the accuracy of the tracking process across the cameras and thus, are useful as a tracking processing device, a tracking processing system provided with the same and a tracking processing method for tracking moving objects by using captured images taken by multiple cameras.

GLOSSARY 1 tracking processing system
2 camera
3 intra-camera tracking processing device
4 inter-camera tracking processing device (tracking processing device)
21 storage unit (storage means)
22 input unit
23 tracking condition setting unit
24 similarity calculating unit (similarity calculating means)
25 moving direction calculating unit (moving direction calculating means)
26 refining unit (refining means)
27 associating unit (associating means)
28 tracking result presenting unit (result presenting means)
29 output unit
30 captured images
31 invalid region
32 invalid region setting unit (invalid region setting means)

The invention claimed is:

1. A tracking system for tracking moving objects comprising:
a plurality of cameras that obtain captured images of the moving objects;
an intra-camera tracking processing device connected to the plurality of cameras; and
an inter-camera tracking processing device connected to the intra-camera tracking processing device via a network, wherein
the plurality of cameras transmit the captured images to the intra-camera tracking processing device,
the intra-camera tracking processing device generates, for each camera, a plurality of pieces of intra-camera tracking information including image information of the moving objects obtained from the captured images and transmits the plurality of pieces of intra-camera tracking information via the network, and
the inter-camera tracking processing device performs inter-camera tracking by:
receiving the plurality of pieces of intra-camera tracking information from the network,
generating refined intra-camera tracking information for each camera by removing some but not all of the plurality of pieces of intra-camera tracking information of one of the moving objects in the captured images received via the network; and
associating at least two of the refined intra-camera tracking information from two different cameras,
wherein the removing of some but not all of the plurality of pieces of intra-camera tracking information of one of the moving objects in the captured image always occurs before associating of at least two of the refined intra-camera tracking information from two different cameras, wherein
the inter-camera tracking processing device sets, for each camera, an invalid region in the captured images, and
the inter-camera tracking processing device generates the refined intra-camera tracking information by removing, from the plurality of pieces of intra-camera tracking information, pieces of intra-camera tracking information relating to the moving objects positioned inside the set invalid region in the captured images.

2. The tracking processing device according to claim 1, wherein
the inter-camera tracking processing device calculates, with regard to the image information of the moving objects, similarity degrees between the plurality of pieces of intra-camera tracking information, and
the inter-camera tracking processing device generates the refined intra-camera tracking information by removing, from the plurality of pieces of intra-camera tracking information, pieces of intra-camera tracking information on the basis of the similarity degrees thereof.

3. The tracking processing device according to claim 1, wherein the inter-camera tracking processing device is configured to re-set the invalid region in response to user input.

4. The tracking processing device according to claim 1, wherein the inter-camera tracking processing device sets the invalid region on the basis of position information of the moving objects relating to the pieces of intra-camera tracking information previously removed by the inter-camera tracking processing device.

5. The tracking processing device according to claim 1, wherein
the inter-camera tracking processing device selects, with regard to the association process performed by the inter-camera tracking processing device, a first operation mode that prioritizes processing accuracy or a second operation mode that prioritizes processing speed, and
when the first operation mode is selected, the inter-camera tracking processing device performs association of the moving objects on the basis of the pieces of inter-camera tracking information, and when the second operation mode is selected, the inter-camera tracking processing device processor performs association of the moving objects on the basis the pieces of intra-camera tracking information.

6. The tracking processing device according to claim 2, wherein
the inter-camera tracking processing device calculates, on the basis of position information of the moving objects in the plurality of pieces of intra-camera tracking information, moving direction vectors of the moving objects, and
the inter-camera tracking processing device associates the at least two of the refined intra-camera tracking information from two different cameras on the basis of degrees of correspondence of angles of the moving direction vectors between the two different cameras.

7. The tracking processing device according to claim 1, wherein
the inter-camera tracking processing device calculates, on the basis of position information of the moving objects in the plurality of pieces of intra-camera tracking information, moving direction vectors of the moving objects, and
the inter-camera tracking processing device associates the at least two of the refined intra-camera tracking information from two different cameras on the basis of degrees of correspondence of angles of the moving direction vectors between the two different cameras.

8. The tracking processing device according to claim 1, wherein the removing operation removes intra-camera tracking information of a moving direction vector of the one of the moving objects when the magnitude of the moving direction vector is smaller than a predetermined threshold.

9. The tracking processing device according to claim 1, further comprising a display displaying:
operation mode selection screen displaying
an icon for selecting a high accuracy mode prioritizing accuracy in the tracking of the moving objects, and
an icon for selecting a high speed mode prioritizing speed in the tracking of the moving objects; and
an invalid region setting screen displaying one of the captured images and accepting a user input for selecting an invalid region within the one of the captured images and associated with the some but not all of the plurality of pieces of intra-camera tracking information removable by the generating operation.

10. A tracking processing method for tracking moving objects, the method comprising:
obtaining captured images of the moving objects with a plurality of cameras;
transmitting from the plurality of cameras the captured images to an intra-camera tracking processing device connected to the plurality of cameras;
generating, with the intra-camera tracking processing device, for each camera, a plurality of pieces of intra-camera tracking information including image information of the moving objects obtained from the captured images and transmitting the plurality of pieces of intra-camera tracking information via a network to an inter-camera tracking processing device;
performing inter-camera tracking processing with the inter-camera tracking processing device by:
receiving the plurality of pieces of intra-camera tracking information from the network;
generating refined intra-camera tracking information for each camera by removing some but not all of the plurality of pieces of intra-camera tracking information of one of the moving objects in the captured images received via the network;
associating at least two of the refined intra-camera tracking information from two different cameras,
wherein the removing of some but not all of the plurality of pieces of intra-camera tracking information of one of the moving objects in the captured image always occurs before associating of at least two of the refined intra-camera tracking information from two different cameras; and
setting, with the inter-camera tracking processing device, for each camera, an invalid region in the captured images,
wherein the generating of the refined intra-camera tracking information with the inter-camera tracking processing device is performed by removing, from the plurality of pieces of intra-camera tracking information, pieces of intra-camera tracking information relating to the moving objects positioned within the set invalid region in the captured images.

11. The tracking processing method according to claim 10, further comprising calculating, with the inter-camera tracking processing device, with regard to the image information of the moving objects, similarity degrees between the plurality of pieces of intra-camera tracking information,
wherein the generating of the refined intra-camera tracking information with the inter-camera tracking processing device is performed by removing, from the plurality of pieces of intra-camera tracking information, pieces of intra-camera tracking information on the basis of the calculated similarity degrees.

12. The tracking processing method according to claim 10, wherein the inter-camera tracking processing device re-sets the invalid region in response to user input.

13. The tracking processing method according to claim 10, wherein setting the invalid region with the inter-camera tracking processing device comprises setting the invalid region on the basis of position information of the moving objects relating to the pieces of intra-camera tracking information previously removed by the generating of the refined intra-camera tracking information.

14. The tracking processing method according to claim 10, further comprising selecting, with the inter-camera tracking processing device, with regard to the associating, between a first operation mode that prioritizes processing accuracy and a second operation mode that prioritizes processing speed,
wherein, when the first operation mode is selected, the association associates the moving objects on the basis of the pieces of inter-camera tracking information, and when the second operation mode is selected, the association associates the moving objects on the basis of the pieces of intra-camera tracking information.

15. The tracking processing device according to claim 11, further comprising calculating, with the inter-camera tracking processing device, on the basis of position information of the moving objects in the plurality of pieces of intra-camera tracking information, moving direction vectors of the moving objects, wherein the inter-camera tracking processing device associates the least two of the refined intra-camera tracking information from two different cameras on the basis of degrees of correspondence of angles of the moving direction vectors between the two different cameras.

16. The tracking processing method according to claim 10, further comprising calculating, with the inter-camera tracking processing device, on the basis of position information of the moving objects in the plurality of pieces of intra-camera tracking information, moving direction vectors of the moving objects, and associating, with the inter-camera tracking processing device, the at least two of the refined intra-camera tracking information from two different cameras on the basis of degrees of correspondence of angles of the moving direction vectors between the two different cameras.

17. A tracking system for tracking moving objects comprising:

a plurality of cameras that obtain captured images of the moving objects;

an intra-camera tracking processing device connected to the plurality of cameras; and an inter-camera tracking processing device connected to the intra-camera tracking processing device via a network, wherein the plurality of cameras transmit the captured images to the intra-camera tracking processing device, the intra-camera tracking processing device generates, for each camera, a plurality of pieces of intra-camera tracking information including image information of the moving objects obtained from the captured images and transmits the plurality of pieces of intra-camera tracking information via the network, and the inter-camera tracking processing device performs inter-camera tracking by:

receiving the plurality of pieces of intra-camera tracking information from the network, selecting one of the moving objects in the captured images that is occluded, generating refined intra-camera tracking information for each camera by removing a piece of intra-camera tracking information of the one of the occluded moving objects from the plurality of pieces of intra-camera tracking information of one of the moving objects in the captured images received via the network; and associating at least two of the refined intra-camera tracking information from two different cameras, wherein the inter-camera tracking processing device sets, for each camera, an invalid region in the captured images, and the inter-camera tracking processing device generates the refined intra-camera tracking information by removing, from the plurality of pieces of intra-camera tracking information, pieces of intra-camera tracking information relating to the moving objects positioned inside the set invalid region in the captured images.

* * * * *